United States Patent Office 3,385,819
Patented May 28, 1968

3,385,819
FIRE RETARDANT COMPOSITIONS
Edward Vernon Gouinlock, Jr., Buffalo, N.Y., assignor to Hooker Chemical Corporation, Niagara Falls, N.Y., a corporation of New York
No Drawing. Filed Sept. 13, 1965, Ser. No. 487,076
16 Claims. (Cl. 260—45.75)

ABSTRACT OF THE DISCLOSURE

Sodium tetraborate compounds have been found to be affective adjuvants for rendering fire retardant polymeric combustible polymers containing a halogenated organic compound selected from the group consisting of perhalopentacyclodecane and compounds of the formula:

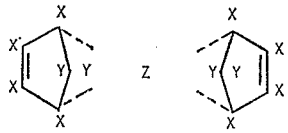

wherein X is selected from the group consisting of bromine, chlorine and fluorine, Y is selected from the group consisting of bromine, chlorine, fluorine, alkyl and alkoxy, and Z is a tetravalent hydrocarbon radical having at least four carbon atoms wherein the valences are attached to two pairs of adjacent carbon atoms. In addition, incandescent after-glow is reduced.

---

This invention relates to novel fire retardant polymeric compositions and to additive compositions for improving the fire retardant properties of polymers.

It is known that the fire retardant properties of various polymeric materials may be enhanced by the addition of various halogenated organic compounds which are derived from polyhalogenated cyclopentadiene. One such compound is perchloropentacyclodecane ($C_{10}Cl_{12}$), a dimer of hexachlorocyclopentadiene. Other fire retardant additives derived from polyhalogenated cyclopentadienes include compounds of the formula

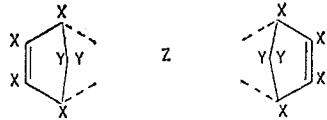

where X is a halogen and Y may be a halogen, alkyl or alkoxy, and Z is a tetravalent hydrocarbon radical. The fire retardant properties of such compositions may be further enhanced by the addition of a compound of antimony, arsenic or bismuth.

The aforementioned prior art fire retardant compositions have been found quite effective for imparting fire retardance to various polymeric materials. Polymeric materials containing these additives are normally self-extinguishing after contact with a flame. However, it has been found that such polymeric materials may exhibit an incandescent afterglow, which may continue for a period of time after the extinction of the flame, presenting a further fire hazard.

It is an object of the present invention to provide improved fire retardant additive compositions which, when incorporated into polymeric materials, not only improve fire retardant properties generally but markedly reduce the afterglow phenomena exhibited by such materials after exposure to flame. It is a further object to provide improved fire retardant polymeric compositions and coatings.

It has now been found that improved fire retardant properties are imparted to polymeric materials by incorporating therein an additive composition comprising (1) a halogenated organic compound selected from the group consisting of perhalopetacyclodecanes of the formula $C_{10}Cl_nBr_{12-n}$ where $n$ may be up to 12, and compounds of the formula

wherein X is selected from the group consisting of bromine, chlorine and fluorine, Y is selected from the group consisting of bromine, chlorine, fluorine, alkyl and akoxy and Z is a tetravalent hydrocarbon radical having at least 4 carbon atoms wherein the valences are attached to 2 pairs of adjacent carbon atoms; and (2) a sodium borate compound selected from the group consisting of anhydrous sodium tetraborate and sodium tetraborate hydrates. The addition of the sodium tetraborate compound has been found to generally improve the fire retardant properties of the polymers may be further improved to minimize and in many cases to completely eliminate the troublesome problem of incandescent afterglow. The fire retardant properties of the polymers may be further improved by the addition of a compound of antimony, arsenic or bismuth. In general, by the addition of a compound of antimony, arsenic or bismuth, smaller amounts of the halogenated organic constituent may be employed to achieve comparable fire retardant properties.

The aforementioned perhalopentacyclodecanes are box dimers of hexahalocyclopentadiene, characterized by the structural formula

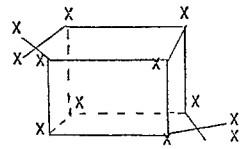

where X is chlorine or bromine. Perchloropentacyclodecane, $C_{10}Cl_{12}$, has a melting range of 483 to 487 degrees centigrade and may be prepared by the condensation of hexahalocyclopentadiene in the presence of aluminum chloride. Details of the preparation of the compound are disclosed in U. S. Patent No. 2,996,553. Other perhalopentacyclodecanes characterized by the formula $C_{10}Cl_nBr_{12-n}$ where $n$ is up to 11 may be prepared by contacting, mixing and reacting hexachlorocyclopentadiene and bromine in the presence of a catalytic amount of aluminum halide until the desired product result is formed. The reaction is described in detail in U.S. patent application S.N. 325,488 now U.S. 3,313,857. Illustrative examples of such compounds are $C_{10}Cl_{11}Br$, $C_{10}Cl_{10}Br_2$, $C_{10}Cl_9Br_3$, $C_{10}Cl_8Br_4$ and the like. Preferred perhalopentacyclodecanes are those characterized by the formula $C_{10}Cl_nBr_{12-n}$ where $n$ is 8 to 12 and the most preferable is $C_{10}Cl_{12}$.

In the compounds of the formula

where X is bromine, chlorine or fluorine, Y is bromine, chlorine, fluorine, alkyl or alkoxy, and Z is a tetravalent hydrocarbon radical, when the Y constituent is an alkyl or alkoxy it may contain for example, from 1 to 10 carbon atoms and preferably from 1 to 6 carbon atoms. The Z constituent may be cyclic or acyclic and may contain substituents such as lower alkyl of 1 to 6 carbon atoms, bromine, chlorine or fluorine. When the Z constituent is acyclic the carbon chain consists of at least 4 carbon atoms and may consist of at least as many as 20 carbon atoms. Typical of such compounds, wherein the Z constituent is acyclic, is the compound bis(1,2,3,4,7,7 hexachlorobicyclo[2.2.1]hept - 2 - ene-5-yl) butane. For convenience this compound will be referred to by its empirical formula $C_{18}H_{14}Cl_{12}$. A detailed description of the preparation of compounds of this type is disclosed in copending application S.N. 345,066, filed Feb. 17, 1964, now abandoned.

When the Z constituent is cyclic, the cyclic structure may contain from 5 to at least 18 carbon atoms and may consist of from 1 to at least 5 cyclic structures. When Z is a plurality of cyclic structures, the cyclic structures are fused, that is, they share carbon atoms. The Z constituent may further contain substituents such as lower alkyl of 1 to 6 carbon atoms, bromine, chlorine or fluorine. A detailed description of the preparation of compounds of this type is disclosed in copending application S.N. 390,- 220, filed Aug. 17, 1964, now abandoned.

Compounds of the formula

where X, Y and Z are of the same definition as previously stated, may be prepared by adducting (Diels Alder reaction) one mole of a polyunsaturated aliphatic or cycloaliphatic compound and two or more moles of a polyhalogenated cyclopentadiene of the formula

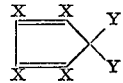

where X and Y are of the same definition as previously stated. The polyunsaturated aliphatic compound mentioned above contains from 4 to at least about 18 carbon atoms and at least two sites of carbon to carbon unsaturation which may be either ethylenic or acetylenic.

The polyunsaturated cycloaliphatic compound above contains from 5 to at least about 18 carbon atoms, has 1 to 5 cyclic structures and when more than one, the cyclic structures are fused, and at least two sites of carbon to carbon unsaturation which may be either ethylenic or acetylenic.

Illustrative of the polyhalogenated cyclopentadienes suitable for preparation of the aforementioned compounds are hexachlorocyclopentadiene, 5,5 - dimethoxytetrachlorocyclopentadiene, hexabromocyclopentadiene, 5,5 - difluorotetrachlorocyclopentadiene, 5,5 - dibromotetrachlorocyclopentadiene and 5,5 - diethoxytetrachlorocyclopentadiene.

Satisfactory polyunsaturated cycloaliphatic compounds for use in preparing the Diels Alder adduct with the polyhalogenated cyclopentadiene include cycloaliphatic compounds exemplified by but not limited to methyl cyclopentadiene, cyclopentadiene, dicyclopentadiene, bicyclo-(2.2.1)heptadiene, 1,5 - cyclooctadiene, cyclodecadiene, and cyclododecatriene.

Suitable polyunsaturated aliphatic compounds for use in preparing the above-described Diels Alder adducts include aliphatic compounds exemplified by but not limited to 1,3-butadiene; 1,5-hexadiene; 1,7-octadiene; 1,11-dodecadiene and dimethyl butadiene.

The preparation of 1,4,7,10-dimethanocycloöcta-1,2,3, 4,7,8,9,10,13,13,14,14 - dodecachloro - 1,4,4a,5,6,6a,7,10, 10a,11,12,12a-dodecahydro[1,2,5,6]dibenzene is disclosed by Ziegler and Froitzheim-Kuhlhorn, Annalen, 1959, 589, 157. The compound has the assigned structure:

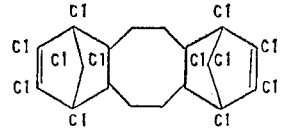

For convenience this compound will be referred to by the short title of 1,5 COD. The adduct may be prepared by condensing two moles of hexachlorocyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,6,7,8,9,13,13,14,14 - dodecachloro - 1,4:5,10:6,9 - trimethano-11H-benzo[b]fluorene may be prepared by condensing two moles of hexachlorocyclopentadiene with one mole of dicyclopentadiene. The adduct has the assigned structure:

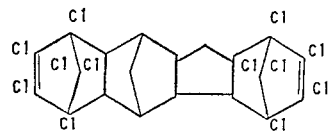

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11 - dodecachloro-1, 4:5,8-dimethanofluorene is prepared by condensing two moles of hexachlorocyclopentadiene with one mole of cyclopentadiene. This adduct has the assigned structure:

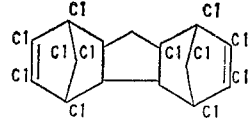

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13 - dodecachloro-1,4:5,8:9,10-trimethano-anthracene is prepared by condensing one mole of the Diels Alder adduct of cyclopentadiene and acetylene with two moles of hexachlorocyclopentadiene. The resulting adduct has the assigned structure:

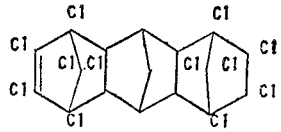

For convenience this adduct will be referred to as BCH. BCH melts at about 340 degrees centigrade and has a vapor pressure of 0.008 millimeter of mercury at 197 degrees centigrade.

The preparation of the aforementioned compound

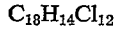

$C_{18}H_{14}Cl_{12}$ is disclosed in copending application S.N. 345,066, filed Feb. 17, 1964, now abandoned. It may be prepared by condensing 2 moles of hexachlorocyclopentadiene with 1 mole of 1,7-octadiene. The condensate is prepared at a temperature between 40 and 200 degrees centigrade and the excess hexachlorocyclopentadiene is removed by vacuum distillation. Thereafter the condensate is recrystallized from benzene to obtain a product that melts at 230 to 233 degrees centigrade.

The preparation of 2,2',3,3',4,4',5,5',7,7,7',7', - dodecachloro-1,1',2,2',5,5',6,6' - octahydro - 2,2',5,5'-methano biphenol is disclosed in United States Patent 2,606,910 issued Aug. 12, 1962. For convenience this compound will be referred to by its empirical formula $C_{14}H_6Cl_{12}$. The adduct is prepared by condensing two moles of hexachlorocyclopentadiene with 1 mole of 1,3-butadiene at a temperature below 200 degrees centigrade and thereafter recrystallizing the reaction product from isopropyl alcohol. The compound melts at about 232 degrees centigrade.

In a similar manner, various other compounds of the formula

where X, Y and Z are as previously defined, which may be employed in the additive compositions of the present invention, may be prepared by a Diels Alder adduction of a mole of a polyunsaturated aliphatic or cycloaliphatic compound and two or more moles of a polyhalogenated cyclopentadiene. The preferred compound is that prepared by adducting two moles of hexachlorocyclopentadiene, with one mole of 1,5 cyclooctadiene, that is, the compound described above and referred to as 1,5 COD.

Of the various antimony, arsenic or bismuth compounds which may be employed in the present compositions, oxides are preferred and the most preferable is antimony trioxide. However, various other compounds of antimony, arsenic or bismuth are suitable. Suitable antimony compounds include the sulfides of antimony, alkali metal salts of the antimony, antimony salts of organic acids and their pentavalent derivatives and the esters of antimonous acids and their pentavalent derivatives. It is convenient to use sodium antimonite or potassium antimonite when it is desired to use an alkali metal salt of the antimony for compositions of this invention. United States Patent 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnate, antimony anisate, and their pentavalent dihalide derivatives. Likewise, the esters of antimonous acids and their pentavalent derivatives disclosed in United States Patent 2,993,924 such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, and in particular the oxides of arsenic and bismuth.

The sodium tetraborate component of the present compositions is preferably, but not necessarily, anhydrous. Anhydrous sodium tetraborate is characterized by the formula $Na_2B_4O_7$. The compound absorbs moisture readily from the air and the hydrous form may contain various amounts of water of hydration up to the hydrate $Na_2B_4O_7.10H_2O$. The various hydrates of sodium tetraborate are suitable for purposes of the present invention.

The various types of combustible polymers which may be rendered fire retardant in accordance with the present invention include, for example, the homopolymers and copolymers of unsaturated aliphatic, unsaturated alicyclic and alkenyl aromatic hydrocarbons. Suitable monomers include ethylene, propylene, butene, pentene, hexene, heptene, octene, 2-methylpropene-1, 3-methylbutene-1, 4-methylpentene-1, 4-methylhexane-1, 5-methylhexene-1, bicyclo-(2.2.1)-2-heptene, butadiene, pentadiene, hexadiene, isoprene, 2,3-dimethylbutadiene-1,3, 2-methylpentadiene-1,3, 4-vinylcyclohexene, vinylcyclohexene, cyclopentadiene, styrene and methylstyrene, and the like.

Polystyrene and polyethylene have been long known in the art. Polystyrene is readily produced by mass, solution or emulsion polymerization as described in The Technology of Plastics and Resins, Mason, J. P. and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

Polyethylene may be prepared from ethylene by various processes. Low-density (0.92 gram per cubic centimeter) polyethylene may be produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described in Fawcett et al., Chemical Abstracts, 32, 1362 (1938). High density polyethylene (e.g. 0.94–0.96 gram per cubic centimeter) having a molecular weight which may vary from about 10,000 to as high as about 3,000,000 may be prepared by the polymerization of ethylene in the presence of complex metal catalysts such as a combination of aluminum triethyl and a halide of titanium or a supported metal oxide catalyst. Similar catalyst systems may be employed to produce polypropylene and various other linear and stereospecific polymers of other α-olefins or conjugated diolefins. The preparation of such polymers is discussed in detail in polymerization of Olefins by Complex Metal Catalysts, by J. K. Stille, Chemical Reviews, vol. 58, No. 541–580 (1958).

Additional polymers which may be improved in accordance with the present invention include, for example, the polyesters, polyamides, polyureas, polyurethanes, alkyds, polyethers, phenolics, urea resins, melamine resins, epoxies and polycarbonates. The polyesters are thermoplastic resins produced by the reaction of a dibasic acid and a dihydroxy compound. The unsaturated polyesters can be further polymerized by crosslinking with an unsaturated monomer, such as styrene. Alkyds are polyesters formed from a polybasic acid and a polyhydric alcohol modified with a fatty acid.

Polyamides are prepared from dibasic acids and diamines. The polyureas may be prepared from the reaction of a diisocyanate and adiamine. Polyurethanes may be prepared from a diisocyanate and a polyfunctional alcohol. Polyethers may be prepared by a ring opening polymerization of acyclic ether or by direct condensation of aldehydes. Typical phenolics are prepared by condensation of phenol and an aldehyde, e.g. novalacs. Urea of melamine may be reacted with formaldehyde to produce resins which are susceptible to further crosslinking. Epoxy thermosetting resins based on the reaction of a bis-phenol and epichlorohydrin. Polycarbonates are thermoplastic polymers prepared, for example, by reaction of a bis-phenol such as bis-(4-hydroxyphenyl)-2,2-propene with phosgene. Preparation of the foregoing polymers is disclosed in detail in Preparative Methods of Polymer Chemistry by W. R. Sorenson and T. W. Campbell, Interscience Publishers, Inc. (1961).

In addition, normally non-flammable polymers such as polyvinyl chloride which may contain a flammable constituent, such as a plasticizer, e.g., dioctyl phalate, are considered herein as combustible polymers which may be improved in accordance with the present invention. Such polymer compositions containing combustible ingredients, such as plasticizers, are discussed in detail in Modern Plastics Encyclopedia Issue for 1965, vol. 42, No. 1A., McGraw-Hill, Inc.

A preferred class of polymers which may be employed in the fire retardant compositions of the present invention are the polyolefins and, in particular, those prepared from olefin monomers having 2 to 4 carbon atoms. Included in this preferred class of polymers are those prepared from monomers of ethylene, propylene and the butylenes. Such polymers are described in detail in the aforementioned articles by Fawcett et al. and by J. K. Stille.

The components comprising the additive compositions of the present invention can be introduced into the polymer individually or as a preformed mixture, by any of several methods. The additives may be introduced into the polymer while the latter is dissolved in a suitable solvent. This procedure is especially useful when it is desired to mix the additives during the polymer manufacturing process. The polymer may then be recovered from the solvent, with the additives intimately mixed therewith. Usually, the additives are mixed with the polymer in the molten state at temperatures that can range from the melting point of the decomposition temperature of the polymer, for example from 70 to 600 degrees centigrade. Alternatively, the additives and polymer may be dry-blended in the finely-divided state so that an intimate mixture is obtained upon subsequent molding or extrusion. Various amounts of the additive may be employed. For example, the halogenated organic constituent may be present at least in amounts varying between about 2 and 60 percent by weight and preferably between about 10 and 35 percent by weight based on the weight of the polymeric composition. The range of sodium tetraborate may vary at least between about 1 and 30 percent by weight and preferably between about 2 and 20 percent by weight of the polymeric composition. A compound of antimony, arsenic or bismuth, e.g., the oxide, may be present in an amount of between about 1 and 30 percent by weight and preferably between about 2 and 15 percent by weight of the polymeric composition. For convenience the additive composition may be employed as a preformed mixture containing, for example, between about 1 and 90 parts by weight of a sodium tetraborate compound and, if desired, between about 1 and 90 parts by weight of an antimony, arsenic or bismuth compound per 100 parts of the halogenated organic constituent. Preferably such additive compositions will contain between about 6 and 50 parts by weight of the antimony, arsenic or bismuth compound and between about 6 and 50 parts by weight of the sodium tetraborate compound per 100 parts of the halogenated organic compound.

By way of further illustrating the present invention and the manner in which it may be practiced, the following specific examples are set forth. Unless otherwise indicated all parts are by weight.

Example 1

A mixture of 60 parts of polypropylene (Avisun 1014, a general purpose, injection molding grade polypropylene), ground to pass 50 mesh, U.S. Standard Sieve series; 30 parts of powdered 1,5 COD; 5 parts of finely divided $Sb_2O_3$; and 5 parts of finely divided anhydrous $Na_2B_4O_7$; was dry blended for 30 minutes and then melt blended for about 5 minutes at 200 degrees centigrade. The blended compositions were then molded at 200 degrees centigrade into rods 7 millimeters in diameter and the rods were tested for fire retardance.

Fire retardance of the rods was tested following a modified version of test procedure D635 of the American Society for Testing Materials. The procedure employed was as follows: The test rod, 7 millimeters in diameter, was held in a horizontal position while a flame from a vertically disposed Bunsen burner, burning propane gas, was held for 30 seconds with the flame touching tangentially on the end of the rod. On removal of the flame, after 30 second ignition time, the burning characteristics of the specimen rod were observed and classified in one of the following three categories: (1) Burning, wherein the rod continued to burn on removal of the flame and the rod was completely consumed; (2) self-extinguishing, wherein the length of time which the specimen burned, after removal of the flame, was noted; and (3) Non-burning, wherein the specimen was self-extinguishing immediately on removal of the flame.

The test was repeated several times with rods of the same composition, and an average of the results was taken. Also observed was the percent of tests in which the rod exhibited an incandescent afterglow after extinction of the flame; the duration of the afterglow in these tests were afterglow occurred after self-extinction of the flame; and the tendency of the material tested to drip while burning.

The rods tested exhibited the following characteristics:

Average self-extinguishing time (seconds) _____ 2
Average duration of incandescent afterglow (seconds) _____ 15
Percent of trials showing afterglow _____ 25
Amount of dripping during burning _____ None Following the procedure of this example, when polyethylene or polybutene is substituted for polypropylene, comparable fire retardant properties are obtained. Similarly, when the aforementioned DCP or CP are substituted for the 1,5 COD, similar improved fire retardance is obtained.

Examples 2–10

The procedure of Example 1 was repeated except that the composition was varied as indicated. The fire retardant characteristics of the various compositions tested are shown hereinbelow:

|  | Example | | | | | | | | |
| --- | --- | --- | --- | --- | --- | --- | --- | --- | --- |
|  | 2 (control) | 3 (control) | 4 | 5 | 6 | 7 | 8 | 9 | 10 |
| Composition (Parts by weight): | | | | | | | | | |
| Polypropylene | 60 | 60 | 60 | 60 | 60 | 55 | 50 | 60 | 50 |
| 1,5 COD | 35 | | | | | 30 | 30 | 30 | 30 |
| $C_{10}Cl_{12}$ | | 35 | 30 | 30 | 30 | | | | |
| $Sb_2O_3$ | 5 | 5 | 5 | 3 | 2.5 | 5 | 5 | 3 | 10 |
| Anhyd. $Na_2B_4O_7$ | | | 5 | 7 | | 10 | 15 | 7 | 10 |
| $Na_2B_4O_7.7.2H_2O$ | | | | | | | | | |
| $Na_2B_4O_7.3.4H_2O$ | | | | | 7.5 | | | | |
| Average self-extinguishing time (seconds) | 11 | 13 | 2 | 10 | 16 | 14 | 21 | 9 | 3 |
| Afterglow: | | | | | | | | | |
| Average duration (seconds) | 37 | (1) | 0 | (2) | (2) | 7 | 0 | 11 | 8 |
| Percent of trials exhibiting afterglow | 80 | 80 | 0 | 25 | 25 | 10 | 0 | 50 | 30 |
| Amount of dripping during burning | (3) | (3) | (4) | (4) | (4) | (4) | (4) | (4) | (4) |

1 About 30.
2 Not observed.
3 Slight.
4 None.

Example 11

In order to test the effectiveness of various other additives such as other borate compounds, in substitution for sodium tetraborate in the compositions of the present invention, the various compounds shown hereinbelow were tested. The formulation and testing procedure of Example 1 was followed except that in place of the sodium tetraborate there was substituted 5 parts by weight of the additive shown. The additives tested and the fire retardant properties of the polymeric compositions containing the various additives are shown hereinbelow. The sodium tetraborate composition of Example 1 as well as the composition of Example 2 containing no additive are included for purpose of comparison.

| Additive | Average self-extinguishing time (seconds) | Average Duration of afterglow (seconds) | Percent of trials exhibiting afterglow |
|---|---|---|---|
| Potassium pentaborate | 30 | 39 | 100 |
| Barium metaborate | 31 | 75 | 100 |
| Zinc borate | 23 | 47 | 100 |
| Potassium tetraborate | 10 | 51 | 100 |
| Ammonium tetraborate | 19 | 16 | 100 |
| Zinc oxide | 9 | 69 | 100 |
| Sodium tetraborate (Example 1) | 2 | 15 | 25 |
| None (Example 2) | 11 | 37 | 80 |

From the foregoing data it will be seen that the other additives, even as chemically similar as potassium and ammonium-tetraborate not only fail to provide the unique fire retardance provided by the sodium tetraborate, but actually cause a deleterious effect on the fire retardant properties, particularly with respect to the duration and frequency of incandescent afterglow.

It may be seen from the examples shown that the presence of hydrous or anhydrous sodium tetraborate results in a marked reduction in the duration and incidence of incandescent afterglow thus minimizing the likelihood of the material acting as a continuing source of ignition. Also, by the addition of the sodium tetraborate, smaller amounts of the halogenated organic compound may be employed to achieve comparable self-extinguishing rates. In addition, the tendency of the material to drip during burning is lessened, thus reducing the hazard caused by the spread of burning molten material.

It will be apparent to those skilled in the art that many variations and modifications of the invention as hereinabove set forth may be made without departing from the spirit and scope of the invention. The invention is not to be construed as being limited to the examples given.

What is claimed:

1. A fire retardant polymeric composition comprising (1) a combustible polymer; (2) a halogenated organic compound selected from the group consisting of perhalopentacyclodecane and compounds of the formula:

wherein X is selected from the group consisting of bromine, chlorine and fluorine, Y is selected from the group consisting of bromine, chlorine, fluorine, alkyl, and alkoxy and Z is a tetravalent hydrocarbon radical having at least four carbon atoms wherein the valences are attached to two pairs of adjacent carbon atoms; and (3) a sodium borate compound selected from the group consisting of anhydrous sodium tetraborate and sodium tetraborate hydrates.

2. A fire retardant polymeric composition according to claim 1 containing a compound of an element of Group IV–A of the Periodic Table, selected from the group consisting of compounds of antimony, arsenic and bismuth.

3. A fire retardant polymeric composition according to claim 2 wherein said halogenated organic compound is a dimer of hexachlorocyclopentadiene characterized by the formula $C_{10}Cl_{12}$.

4. A fire retardant polymeric composition according to claim 3 wherein said compound of an element of Group IV–A is $Sb_2O_3$.

5. A fire retardant polymeric composition according to claim 4 comprising between about 10 and 35 percent by weight of $C_{10}Cl_{12}$; between about 2 and 20 percent by weight of anhydrous sodium tetraborate; and between about 2 and 15 percent by weight of $Sb_2O_3$.

6. A fire retardant polymeric composition according to claim 4 wherein said combustible polymer is polypropylene.

7. A fire retardant polymeric composition according to claim 2 wherein said halogenated organic compound is characterized by the formula

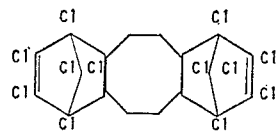

8. A fire retardant polymeric composition according to claim 7 wherein said compound of an element of Group IV–A is $Sb_2O_3$.

9. A fire retardant polymeric composition according to claim 8 comprising between about 10 and 35 percent by weight of said halogenated organic compound; between about 2 and 20 percent by weight of anhydrous sodium tetraborate; and between about 2 and 15 percent by weight of $Sb_2O_3$.

10. A fire retardant polymeric composition according to claim 8 where in said combustible polymer is polypropylene.

11. A fire retardant additive composition for combustible polymers, said additive composition comprising (1) a halogenated organic compound selected from the group consisting of perhalopentacyclodecane and compounds of the formula:

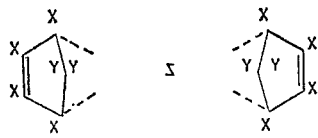

wherein X is selected from the group consisting of bromine, chlorine and fluorine, Y is selected from the group consisting of bromine, chlorine, fluorine, alkyl and alkoxy and Z is a tetravalent hydrocarbon having at least four carbon atoms wherein the valences are attached to two pairs of adjacent carbon atoms; and (2) a sodium borate compound selected from the group consisting of anhydrous sodium tetraborate and sodium tetraborate hydrates.

12. A fire retardant additive composition according to claim 11 containing a compound of an element of Group IV–A of the Periodic Table, selected from the group consisting of compounds of antimony, arsenic and bismuth.

13. A fire retardant additive composition, according to claim 12 wherein said halogenated organic compound is a dimer of hexachlorocyclopentadiene characterized by the formula $C_{10}Cl_{12}$, and said compound of an element of Group IV–A is $Sb_2O_3$.

14. A fire retardant additive composition according to claim 13 which comprises in parts by weights, between about 6 and 50 parts of $Sb_2O_3$, and between about 6 and 50 parts of anhydrous sodium tetraborate, per 100 parts of said $C_{10}Cl_{12}$.

15. A fire retardant additive composition according to claim 12 where said halogenated organic compound is characterized by the formula

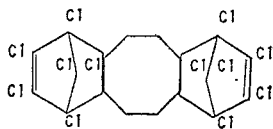

and said compound of an element of Group IV–A is $Sb_2O_3$.

16. A fire retardant additive composition according to claim 15 which comprises, in parts by weight, between about 6 and 50 parts $Sb_2O_3$ and between about 6 and 50 parts of anhydrous sodium tetraborate per 100 parts of the compound characterized by the formula:

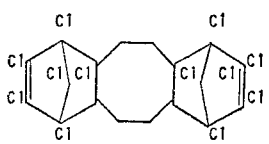

References Cited

UNITED STATES PATENTS

| | | | |
|---|---|---|---|
| 3,158,588 | 11/1964 | Johnson | 260—45.75 |
| 3,313,857 | 4/1967 | Gelfand | 260—648 |

FOREIGN PATENTS 695,560    10/1964    Canada.

OTHER REFERENCES

Modern Plastics, Encyclopedia 1963, vol. 40, No. 14, September 1962, page 479, article entitled "Methods of Flameproofing . . ." by Gerry Mack.

Chemical Reviews, vol. 58, pp. 249, 250 and 254, publisher, Williams and Wilkins Co., 1958. Article by Ungrade et al., entitled "The Chemistry of Perchlorocyclopentenes and Cyclopentadienes," Scientific Library No. QD1A563.

DONALD E. CZAJA, *Primary Examiner.*

V. P. HOKE, *Assistant Examiner.*

UNITED STATES PATENT OFFICE
CERTIFICATE OF CORRECTION

Patent No. 3,385,819 May 28, 1968

Edward Vernon Gouinlock, Jr.

It is certified that error appears in the above identified patent and that said Letters Patent are hereby corrected as shown below:

Column 2, line 5, "perhalopetacyclodecanes" should read -- perhalopentacyclodecanes --; line 17, "akoxy" should read -- alkoxy --; line 24, "the polymers may be further im-" should read -- such compositions and specifically --; line 55, cancel "chloride. Details of the preparation of the compound are". Column 3, line 49, after "compound" insert -- mentioned --. Column 7, line 19, "of" should read -- to --. Column 8, line 32, "were" should read -- where --.

Signed and sealed this 17th day of March 1970.

(SEAL)
Attest:

Edward M. Fletcher, Jr.
Attesting Officer

WILLIAM E. SCHUYLER, JR.
Commissioner of Patents